United States Patent
Irie et al.

(10) Patent No.: US 8,513,148 B2
(45) Date of Patent: Aug. 20, 2013

(54) THERMALLY ADHESIVE LAMINATED NONWOVEN FABRIC

(75) Inventors: Takaharu Irie, Tokyo (JP); Ikuo Ueno, Tokyo (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 231 days.

(21) Appl. No.: 12/161,516

(22) PCT Filed: Jan. 24, 2007

(86) PCT No.: PCT/JP2007/051091
§ 371 (c)(1),
(2), (4) Date: Jul. 18, 2008

(87) PCT Pub. No.: WO2007/086429
PCT Pub. Date: Aug. 2, 2007

(65) Prior Publication Data
US 2010/0189936 A1    Jul. 29, 2010

(30) Foreign Application Priority Data
Jan. 25, 2006    (JP) ................................. 2006-015882

(51) Int. Cl.
*B32B 5/26* (2006.01)
*B32B 7/04* (2006.01)
*B32B 27/02* (2006.01)
*D04H 3/11* (2012.01)
*D04H 3/14* (2012.01)

(52) U.S. Cl.
USPC ........... 442/389; 442/327; 442/392; 442/381; 442/364; 442/411

(58) Field of Classification Search
USPC ................. 442/327, 340, 346, 347, 361, 362, 442/364
See application file for complete search history.

(56) References Cited

U.S. PATENT DOCUMENTS

| 6,187,699 B1 | 2/2001 | Terakawa et al. |
| 6,797,655 B2 * | 9/2004 | Rudisill ...................... 442/400 |
| 2003/0026927 A1 * | 2/2003 | Sharma et al. ............... 428/36.1 |

FOREIGN PATENT DOCUMENTS

| EP | 1 604 813 A1 | 12/2005 |
| JP | 6-128859 | 5/1994 |

(Continued)

OTHER PUBLICATIONS

Kopnick, Horst; article titled "Polyesters", pp. 18 and 19, Tables 3 and 4, published by Wiley, copyright 2005.*

(Continued)

*Primary Examiner* — Jennifer A Steele
(74) *Attorney, Agent, or Firm* — Finnegan, Henderson, Farabow, Garrett & Dunner, L.L.P.

(57) ABSTRACT

A thermally adhesive laminated nonwoven fabric that is a laminated nonwoven fabric in which nonwoven fabrics of the following (a) layer, (b) layer and (c) layer are integrated by heat contact bonding:
(a) layer having at least one filament yarn nonwoven fabric layer composed of a thermoplastic resin;
(b) layer having at least one extremely fine yarn nonwoven fabric layer composed of the same type of thermoplastic resin as that of the (a) layer; and
(c) layer having at least one composite filament yarn nonwoven fabric layer composed of a thermoplastic resin, and
that satisfies the following (1) and (2):
(1) a difference between the melting point of the yarn forming the nonwoven fabric of the (a) layer and that of a yarn forming the nonwoven fabric of the (b) layer is 30° C. or less; and
(2) the composite filament yarn composed of a thermoplastic resin and forming the nonwoven fabric of the (c) layer contains a low melting point component, and the melting point of the low melting point component is lower than that of the yarn forming the nonwoven fabric of the (a) layer by 40 to 150° C.

8 Claims, 1 Drawing Sheet

(56) References Cited

FOREIGN PATENT DOCUMENTS

| | | |
|---|---|---|
| JP | 7-507847 | 8/1995 |
| JP | 9-209254 | 8/1997 |
| JP | 2000-202011 | 7/2000 |
| JP | 2001-315239 | 11/2001 |
| JP | 2003-053871 | 2/2003 |
| WO | WO 2004/082930 | 9/2004 |
| WO | WO 2004/094136 | 11/2004 |
| WO | WO 2007/016480 A2 | 2/2007 |

OTHER PUBLICATIONS

Science and Engineering of Materials, p. 689, Table 15-5, Askeland and Phule, 4th edition, copyright 2003.*
Office Action dated Aug. 10, 2010 issued in corresponding Taiwanese patent application.
Database WPI, Thomson Scientific, London, GB: JP 11 170467 A (Miki Tokushu Seishi KK) (XP-002662914 dated Jun. 29, 1999).
International Search Report dated Nov. 22, 2011 issued in the corresponding international patent application.

* cited by examiner

THERMALLY ADHESIVE LAMINATED NONWOVEN FABRIC

TECHNICAL FIELD

The present invention relates to a laminated nonwoven fabric having thermal adhesivity on one side.

BACKGROUND ART

A filament yarn nonwoven fabric mainly formed from a thermoplastic resin shows a high tenacity in comparison with other nonwoven fabrics during the preparation of bags, lids of containers and the like, and can be laminated by heat bonding without using an adhesive. As a result, the nonwoven fabric can be efficiently worked, and used in a wide range of applications. However, in order to obtain a sufficient tenacity of the nonwoven fabric, a thermoplastic resin having a high melting point must be used. The thermal adhesivity of the resultant nonwoven fabric to a nonwoven fabric or a film for which a low melting point resin is used has been insufficient.

Furthermore, when a conventional filament yarn nonwoven fabric composed of a thermoplastic resin is required to have a filtering function, fine particles are leaked because gaps among yarns forming the nonwoven fabric are too large. In other words, the nonwoven fabric has a disadvantage in that the filtering function is poor. However, when the fabric weight of the nonwoven fabric is increased to improve the filtering function, the thickness of the nonwoven fabric is increased to make the heat-sealing function poor. Since the nonwoven fabric has the above disadvantage, it is difficult to make a bag or the like of the nonwoven fabric.

As conventional technologies, for example, Japanese Unexamined Patent Publication (Kokai) No. 2000-202011 proposes a deodorizing and dehumidifying sheet prepared by superimposing two sheets having air and light permeability, integrally contact bonding a plurality of sites to form an absorption chamber, and packing a deodorizing agent and a dehumidifying agent. The patent publication describes that the sheet is useful for a mattress and the like. However, the sheet has a disadvantage in that powder leakage occurs when the particles of a filled material are fine or the material may become a powder.

Furthermore, when bags are produced from a filament yarn nonwoven fabric composed of a thermoplastic resin by heat bonding, the nonwoven fabric is usually heated and contact bonded at temperatures of the melting point or higher of the thermoplastic resin forming the yarn. The production apparatus must therefore be operated in the bag-making step at high temperature over a long time. As a result, the production step has a disadvantage in that a thermoplastic resin is melted and sticks to the hot roll and hot plate heater to deteriorate the product quality, and that the working rate cannot be increased. Moreover, when the heat bonding temperature is lowered, a predetermined sealing tenacity cannot be obtained. As a result, the production step also has a disadvantage in that complicated temperature control must be conducted.

In order to solve such problems, Japanese Unexamined Patent Publication (Kokai) No. 2001-315239 discloses a nonwoven fabric having a structure in which a non-heat-sealing layer and a heat-sealing layer are laminated. However, because the non-heat-sealing layer and the heat-sealing layer are laminated by the bonding action of the low melting point component in the composite yarn used in the nonwoven fabric, the adhesivity is greatly influenced by the compatibility of the thermoplastic resins. As a result, peeling is likely to take place between the non-heat-sealing layer and the heat-sealing layer even when both layers are heat contact bonded at temperatures close to the melting point of the low melting point component, and they cannot be bonded in a completely melt-sticking state.

Furthermore, the low melting point component that is melted for the purpose of laminating the two layers strikes through the non-heat-sealing layer, and the nonwoven fabric has a disadvantage in that good one side heat-sealing properties cannot be obtained.

As explained above, no conventional filament yarn nonwoven fabric composed of a thermoplastic resin satisfies both the filtering function and the heat-sealing function. Therefore, a thermally adhesive laminated nonwoven fabric that shows improvements in both functions is desired.

DISCLOSURE OF THE INVENTION

Problems to Be Solved by the Invention

An object of the present invention is to provide a thermally adhesive laminated nonwoven fabric having a fine yarn structure and excellent in a filtering function, a barrier function, heat-sealing properties and the like, namely, a thermally adhesive laminated nonwoven fabric showing no powder leakage of fine or friable particles, having a high burst strength, excellent in one side heat-sealing properties, and capable of forming a stabilized heat seal over a wide range of temperatures.

Means for Solving the Problems

As a result of intensively carrying out investigations to solve the above problems, the present inventors have found that the above problems can be solved by forming a laminated nonwoven fabric having a structure in which a layer having at least one filament yarn nonwoven fabric layer composed of a thermoplastic resin as an (a) layer, a layer having at least one extremely fine yarn nonwoven fabric layer composed of a thermoplastic resin of the same type as the (a) layer as (b) layer, and a layer having at least one composite filament yarn nonwoven fabric layer composed of a thermoplastic resin that contains a low melting point component having a specific melting point temperature range as a (c) layer are laminated, and the present invention has thus been achieved.

In other words, the present invention is as explained below.

1. A thermally adhesive laminated nonwoven fabric that is a laminated nonwoven fabric in which nonwoven fabrics of the following (a) layer, (b) layer and (c) layer are integrated by heat contact bonding:

(a) layer having at least one filament yarn nonwoven fabric layer composed of a thermoplastic resin;

(b) layer having at least one extremely fine yarn nonwoven fabric layer composed of the same type of thermoplastic resin as that of the (a) layer; and (c) layer having at least one composite filament yarn nonwoven fabric layer composed of a thermoplastic resin, and that satisfies the following (1) and (2):

(1) a difference between the melting point of the yarn forming the nonwoven fabric of the (a) layer and that of a yarn forming the nonwoven fabric of the (b) layer is 30° C. or less; and (2) the composite filament yarn composed of a thermoplastic resin and forming the nonwoven fabric of the (c) layer contains a low melting point component, and the melting point of the low melting point component is lower than that of the yarn forming the nonwoven fabric of the (a) layer by 40 to 150° C.

2. The thermally adhesive laminated nonwoven fabric according to 1 mentioned above, wherein an amount (wt. %) of the extremely fine yarn forming the nonwoven fabric of the (b) layer is from 5 to 50 wt. % based on the yarn amount of the whole laminated nonwoven fabric.

3. The thermally adhesive laminated nonwoven fabric according to 1 or 2 mentioned above, wherein the average yarn diameter of the extremely fine yarn forming the nonwoven fabric of the (b) layer is from 1 to 3 µm.

4. The thermally adhesive laminated nonwoven fabric according to any one of 1 to 3 mentioned above, wherein the filament yarn composed of a thermoplastic resin and forming the nonwoven fabric of the (a) layer is a polyester filament yarn.

5. The thermally adhesive laminated nonwoven fabric according to any one of 1 to 4 mentioned above, wherein the composite filament yarn composed of a thermoplastic resin and forming the nonwoven fabric of the (c) layer is a sheath-core composite yarn in which the low melting point component is used as the sheath component.

6. The thermally adhesive laminated nonwoven fabric according to 4 mentioned above, wherein the polyester filament yarn forming the nonwoven fabric of the (a) layer is a poly(ethylene terephthalate) yarn.

7. The thermally adhesive laminated nonwoven fabric according to 5 mentioned above, wherein the sheath component of the sheath-core composite yarn is a polyethylene, and the core component is a poly(ethylene terephthalate).

8. The thermally adhesive laminated nonwoven fabric according to 5 mentioned above, wherein the sheath component of the sheath-core composite yarn is a copolymerized polyester, and the core component is a poly(ethylene terephthalate).

9. The thermally adhesive laminated nonwoven fabric according to any one of 1 to 8 mentioned above, wherein when the external surface of the (c) layer of the thermally adhesive nonwoven fabric is mutually superimposed and heat sealed, the heat-sealing tenacity is 0.2 (N/25 mm width·[m²]) or more in the heat-sealing temperature range of from 125 to 230° C., and the variation rate of the heat-sealing tenacity R/x (wherein R represents a variation, and x represents the average value) is 80% or less.

DETAILED DESCRIPTION OF THE INVENTION

Figure 1:
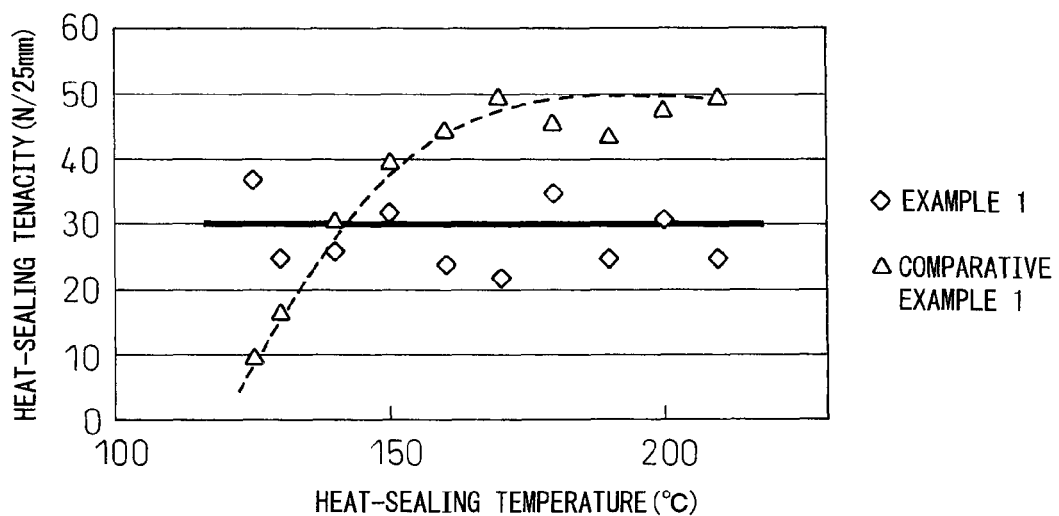
FIG. 1 is a graph showing one example of the relationship between a heat-sealing temperature and a heat-sealing tenacity.

The present invention will be explained below in detail.

In the present invention, the thermally adhesive laminated nonwoven fabric refers to a laminated nonwoven fabric having excellent barrier properties and, on one side, heat-sealing properties.

The thermally adhesive laminated nonwoven fabric of the present invention is a laminated nonwoven fabric in which a layer having at least one filament yarn nonwoven fabric layer composed of a thermoplastic resin as an (a) layer, a layer having at least one extremely fine yarn nonwoven fabric layer composed of a thermoplastic resin of the same type as the (a) layer as a (b) layer, and a layer having at least one composite filament yarn nonwoven fabric layer composed of a thermoplastic resin that contains a low melting point component having a specific melting point temperature range as a (c) layer are integrated by heat contact bonding.

For the laminated nonwoven fabric, the yarn forming the nonwoven fabric of the (b) layer is composed of a thermoplastic resin that is of the same type as that of the yarn forming the nonwoven fabric of the (a) layer, and a difference between the melting points of both resins is from 0 to 30° C. or less. Moreover, the composite filament yarn forming the nonwoven fabric of the (c) layer has a low melting point component, which has a melting point lower than that the yarn forming the nonwoven fabric of the (a) layer by 40 to 150° C.

The (a) layer in the thermally adhesive laminated nonwoven fabric of the invention has at least one filament yarn nonwoven fabric layer composed of a thermoplastic resin. When the nonwoven fabric is not formed from a filament yarn composed of a thermoplastic resin, the tenacity of the nonwoven fabric is decreased, and the productivity is lowered.

It is necessary that the thermoplastic resin used for the nonwoven fabric of the (a) layer be capable of forming a yarn and being spun with a conventional melt-spinning apparatus. Specific examples of the thermoplastic resin include a polyester one, a polyamide one and a polyolefin one.

The polyester thermoplastic resin is a polyester, a copolymer of the polyester or a mixture of the polyester and the copolymer. Specific examples of the polyester include a poly(ethylene terephthalate) (hereinafter referred to as PET sometimes), a poly(butylene terephthalate) and a poly(trimethylene terephthalate). These polyesters are obtained by polymerizing an aromatic dicarboxylic acid such as terephthalic acid, isophthalic acid, phthalic acid or naphthalene dicarboxylic acid with a diol such as ethylene glycol, diethylene glycol, 1,4-butanediol or cyclohexanedimethanol. A resin having biodegradability such as a poly(lactic acid) and other aliphatic polyester resins can also be employed.

Furthermore, a resin having water absorption properties such as a copolymer of a polyester and a polyalkylene glycol can also be employed.

Examples of the polyamide resin include nylon 6 that is synthesized by polycondensation reaction of an ω-amino acid, and nylon 66, nylon 610 and nylon 612 that are synthesized by co-condensation polymerization reaction of a diamine and a dicarboxylic acid.

Furthermore, examples of the polyolefin resin include a polyethylene (hereinafter referred to as PE), a polypropylene (hereinafter referred to as PP) and an ethylene-propylene copolymer. The polypropylene may be a polymer synthesized by a conventional Ziegler-Natta catalyst, or it may also be a polymer synthesized by a single site activation catalyst represented by metallocene.

The polyethylene can be a HDPE (high density polyethylene), a LLDPE (linear low density polyethylene), a LDPE (low density polyethylene), or the like. Moreover, it may also be a copolymer of a polypropylene and a polyethylene or a polymer in which a polyethylene and other additives are added to a polypropylene.

The filament yarn forming the nonwoven fabric of the (a) layer preferably has an average yarn diameter as relatively thick as 7 µm or more. When the average yarn diameter is 7 µm or more, a nonwoven fabric having a sufficient tenacity can be obtained with high productivity. A polyester filament yarn nonwoven fabric that is obtained by spun bonding and that has a high strength with a relatively low fabric weight is preferred, and a PET filament yarn nonwoven fabric is particularly preferred.

The extremely fine yarn nonwoven fabric layer of the (b) layer (intermediate layer) in the thermally adhesive laminated nonwoven fabric of the present invention has a characteristic fibrous structure for playing an important role of producing a filtering function and a bonding strengthening function, that are peculiar effects of the invention.

In other words, the nonwoven fabric of the (b) layer is formed from an extremely fine yarn, and the extremely fine yarn intrudes, during bonding, into gaps among relatively thick yarns forming the nonwoven fabric of the (a) layer and that of the (c) layer to effect mutual interlacing and heat contact bonding. The resultant firm anchoring effect and bond-strengthening function can firmly heat contact bond the nonwoven fabric of the (a) layer and that of the (c) layer, and integrate the non-heat-sealing layer and the heat-sealing layer.

The thermally adhesive laminated nonwoven fabric of the present invention prevents the low melting point component of the (c) layer from striking through the (a) layer during heat sealing. In order to make the thermally adhesive laminated nonwoven fabric of the invention fully realize prevention of striking through of the resin, etc., a filtering function and a barrier function, the nonwoven fabric of the (b) layer contains at least one extremely fine yarn nonwoven fabric layer composed of a thermoplastic resin. The ratio of the extremely fine yarn to the yarn amount of the entire laminated nonwoven fabric is preferably from 5 to 50 wt. %, more preferably from 10 to 30 wt. %. When the ratio of the extremely fine yarn is in the above range, a laminated nonwoven fabric showing prevention of striking through of the resin, etc., and having a filtering function, a barrier function and a sufficient tenacity can be obtained.

Furthermore, an amount of the extremely fine yarn is preferably 1 g/m² or more, more preferably 1.5 g/m² or more.

The average yarn diameter of the extremely fine yarn is preferably from 1 to 3 μm. When the average yarn diameter is from 1 to 3 μm, the extremely fine yarn can intrude into gaps among yarns of the nonwoven fabrics of the (a) layer and the (c) layer. As a result, the anchoring effect and the bond strengthening function are improved. An extremely fine yarn nonwoven fabric prepared by melt blowing is particularly preferred for the (b) layer, because a firm anchoring effect and a bond strengthening action of the (b) layer on the nonwoven fabrics of the (a) layer and the (c) layer can be effectively achieved.

In order to laminate and integrate the nonwoven fabric of the (a) layer and that of the (b) layer in the present invention, the nonwoven fabric of the (a) layer and that of the (b) layer each preferably have heat bonding properties of the same degree. In order to easily heat bond the two layers easily at the same temperature, the yarn forming the nonwoven fabric of the (b) layer preferably formed from the same type of a thermoplastic resin as that of the yarn forming the nonwoven fabric of the (a) layer.

The resin used for the nonwoven fabric of the (b) layer is the same type of the resin as used for the nonwoven fabric of the (a) layer, for example, a polyester resin, a polyamide resin, a polyolefin resin, or the like. Of the resins, a polyester resin capable of having a high strength with a relatively low fabric weight is preferred, similarly to the nonwoven fabric of the (a) layer.

The solution viscosity of the polyester resin used for the nonwoven fabric of the (b) layer is preferably from 0.2 to 0.8 $\eta_{sp}/c$, more preferably from 0.2 to 0.6 $\eta_{sp}/c$. When the solution viscosity is too high, drawing of the yarn becomes insufficient in the spinning step. As a result, an extremely fine yarn diameter is hardly obtained. Moreover, when the solution viscosity is too low, fly is likely to be produced in the production step, and stabilized spinning is hardly conducted.

In the present invention, a difference between the melting point of the yarn forming the nonwoven fabric of the (a) layer and that of the yarn forming the nonwoven fabric of the (b) layer is 30° C. or less.

Because the nonwoven fabric of the (a) layer and the nonwoven fabric of the (b) layer are heat bonded during the preparation of the laminated nonwoven fabric, the heat bonding temperature is hardly optimized when the melting point difference exceeds 30° C., i.e., a heat contact bonding temperature suited to a higher melting point yarn thermally deteriorates a lower melting point yarn and destroys the fibrous shape to cause the yarn to be easily melted. A heat contact bonding temperature suited to the lower melting point yarn is insufficient for melting the higher melting point yarn. As a result, the bonding strength becomes insufficient, and lowering of a friction fluffing strength (problem of fluffing caused by friction) or the like is likely take place.

Regarding heat contact bonding the nonwoven fabric of the (b) layer and that of the (c) layer during the preparation of the laminated nonwoven fabric, the similar explanation as above is possible.

In the present invention, the nonwoven fabric layer of the (c) layer is an important layer for imparting excellent heat-sealing properties. The nonwoven fabric layer is formed from a thermoplastic composite filament yarn containing a specific low melting point component. Because the (c) layer contains the low melting point component, the external surface of the (c) layer of the laminated nonwoven fabric has excellent heat-sealing properties.

The nonwoven fabric of the (c) layer has a thick yarn diameter similarly to the nonwoven fabric of the (a) layer, and is excellent in a strength and a wear resistance. Moreover, the nonwoven fabric is formed from a composite filament yarn composed of a thermoplastic resin, in order to obtain excellent one-side heat-sealing properties. The composite filament yarn contains a low melting point component, and the melting point of the low melting point component is lower than that of the yarn forming the nonwoven fabric of the (a) layer by 40 to 150° C.

When a nonwoven fabric formed from a high melting point yarn and a nonwoven fabric formed from a low melting point yarn are heat contact bonded and integrated during heat contact bonding, the melting point difference exceeding 150° C. makes optimization of the contact bonding temperature difficult. When the nonwoven fabrics are heat contact bonded at high temperature, the low melting point yarn tends to be thermally deteriorated. When the nonwoven fabrics are heat contact bonded at temperatures suited to the low melting point yarn, the high melting point yarn is not softened and melted adequately. As a result, the bonding strength and the friction fluffing strength are likely to lower.

A nonwoven fabric formed from a filament yarn by spun bonding is preferred as a nonwoven fabric of the (c) layer because the nonwoven fabric shows a high strength with a relatively low fabric weight. Moreover, in order to obtain excellent heat-sealing properties, a spun bonded nonwoven fabric formed from a sheath-core composite yarn wherein the sheath portion is a low melting point component, and the core portion is a high melting point component is preferred.

The content of a low melting point component in the above sheath-core composite yarn is preferably from 20 to 80 wt. % based on the composite yarn, more preferably from 30 to 70 wt. %, particularly preferably from 40 to 60 wt. %. When the proportion of the low melting point component is in the above range, a yarn showing a sufficient heat-sealing tenacity and good spinnability and having a sufficient tenacity is obtained. As a result, a nonwoven fabric obtained from the yarn shows a high tenacity.

Examples of the thermoplastic resin used as the low melting point component include olefin resins such as a polyethylene (hereinafter referred to as PE), a polypropylene (hereinafter referred to as PP) and an ethylene-polypropylene copolymer, low melting point polyester resins such as a copolymerized polyester (hereinafter referred to as COPET).

Examples of the PP include a polymer synthesized by a conventional Ziegler-Natta catalyst, and a polymer synthesized by a single site activation catalyst represented by metallocene. Examples of the PE include a HDPE (high density polyethylene), a LLDPE (linear low density polyethylene) and a LDPE (low density polyethylene). Moreover, the examples also include a copolymer of a PP and a PE, and a polymer in which a PE and other additives are added to a PP.

Examples of the copolymerized polyester include a polymer in which an aromatic dicarboxylic acid such as terephthalic acid, isophthalic acid, phthalic acid or naphthalene dicarboxylic acid is polymerized with a diol such as ethylene glycol, diethylene glycol, 1,4-butanediol or cyclohexanedimethanol. Moreover, a resin having biodegradability, for example, an aliphatic polyester resin such as a poly(lactic acid) may also be employed.

Examples of the combination of a sheath component and a core component in the sheath-core composite yarn include a PE as a sheath portion and a PET (a melting point difference of about 133° C.) as a core portion, a COPET as a sheath portion and a PET (melting point difference of about 55° C.) as a core portion, and a PP as a sheath portion and a PET (melting point difference of about 103° C.) as a core portion.

The composite filament yarn forming the nonwoven fabric of the (c) layer is preferably a thermoplastic composite filament yarn having an average yarn diameter of 7 μm or more. When the average yarn diameter is 7 μm or more, a nonwoven fabric having a sufficient tenacity can be obtained with high productivity.

In order to obtain the thermally adhesive laminated nonwoven fabric of the present invention, the constituent layers should be partially heat contact bonded to be laminated and integrated. The boundary between the (a) layer and the (b) layer and the one between the (b) layer and the (c) layer becomes in a film-like molten state. As a result, the shape of a laminated nonwoven fabric is maintained, and improvement in the strength and fluffing of the laminated nonwoven fabric can be made.

Although there is no specific restriction on the method of laminating and integrating the nonwoven fabrics by heat contact bonding in the present invention, a known method of heating and contact bonding the nonwoven fabrics between an emboss roll and a smoothing roll is appropriately adopted. A heating temperature of from the softening point or more to the melting point or less of the yarn, and a line pressure of from 10 to 100 N/cm are appropriate. The nonwoven fabric layers are partially bonded with a contact bonding area ratio of from 5 to 40% (emboss area ratio), more preferably from 10 to 25%. When the contact bonding area ratio is in the above range, lamination of the nonwoven fabric layers with a sufficient bonding area is achieved. As a result, an excellent wear resistance of the nonwoven fabric is obtained, and the nonwoven fabric gives a good feeling (not paper-like).

The external surface of the (c) layer of the thermally adhesive laminated nonwoven fabric in the present invention is used as a heat-sealing surface, and the nonwoven fabric is worked to have a given shape. For example, when the nonwoven fabric is worked into a bag shape, the external surface of the (c) layer of the laminated nonwoven fabric is superimposed, and heat sealed. Therefore, the external surface of the (c) layer greatly contributes to the heat-sealing properties. In particular, the low melting point components of the sheath portions in the sheath-core composite yarns are melted, and melt stick to each other on the heat sealing surfaces to contribute to the heat-sealing tenacity. The high melting components of the core portions are not melted, maintain a fibrous shape, and can exhibit a suitable reinforcing effect.

In addition, after heat sealing, the nonwoven fabric of the (a) layer holds a fibrous shape, and maintains the feeling of a nonwoven fabric, and the extremely fine yarn nonwoven fabric of the (c) layer holds a fibrous shape, and can adequately exhibit a filtering function.

Such worked products obtained from the thermally adhesive laminated nonwoven fabric of the invention as bags show a high heat-sealing tenacity. As a result, even when bags containing a packed material are dropped, or even when heavy material is further mounted on the bags containing a packed material, the bags show an excellent effect of not being damaged.

A first feature of the heat-sealing function of the thermally adhesive laminated nonwoven fabric in the present invention is that the nonwoven fabric shows a stabilized high heat-sealing tenacity in a wide range of heat-sealing temperature, i.e., for the thermally adhesive laminated nonwoven fabric of the invention, when the external surface of the (c) layer is used as a heat-sealing surface, and heat sealing is conducted at heat-bonding temperatures of 110 to 230° C., the heat-sealing tenacity becomes preferably 0.2 (N/25 mm width·fabric weight $[m^2]$) or more, more preferably 0.3 (N/25 mm width·fabric weight $[m^2]$) or more, still more preferably 0.4 to 1 (N/25 mm width·fabric weight $[m^2]$). In addition, the expression (N/25 mm width·fabric weight $[m^2]$) designates a heat-sealing tenacity per unit fabric weight.

For example, for the nonwoven fabric having a fabric weight of 50 $g/m^2$, the heat-sealing tenacity is preferably 10 N/25 mm width or more, more preferably 15 N/25 mm width or more, still more preferably from 20 to 50 N/25 mm width. When the heat-sealing tenacity is in the above range, no peeling of the sealed portion takes place, and a problem such as external leakage of the contents packed in the bag does not arise. Moreover, the variation of heat sealing tenacity (R/x wherein R represents a variation, and x represents an average value) is preferably 80% or less, more preferably 60% or less.

As shown in Table 4 in examples to be described later, even when the heat-sealing temperature is set in a range as wide as 125 to 230° C., the heat-sealing tenacity is from 22 to 38 N/25 mm width with a very small variation of a heat-sealing tenacity (R/x). In other words, it is understood that a stabilized high heat-sealing tenacity is obtained over a wide heat-sealing temperature range. Because intrusion of the extremely fine yarn of the (b) layer into the interior of the nonwoven fabrics of the (a) layer and the (b) layer improves the layer-to-layer peel tenacity of the non-heat-sealing layer and the heat-sealing layer and the heat sealing properties, the above results are obtained. The layer-to-layer peel tenacity is preferably 2.0 N/25 mm width or more, more preferably 2.5 N/25 mm width or more.

A second feature of the heat-sealing function of the thermally adhesive laminated nonwoven fabric in the present invention is that the nonwoven fabric is excellent in a hot tack tenacity as shown in Table 5 in examples to be described later. The nonwoven fabric shows an excellent heat-sealing tenacity even when heat sealed for as instantaneous as 0.5 sec. That the nonwoven fabric can be heat sealed in an extremely short period of time signifies that the nonwoven fabric has a function of complying with high speed heat sealing. The thermally adhesive laminated nonwoven fabric of the invention is therefore extremely advantageous to be used in the industrial production because the nonwoven fabric is capable of being heat sealed at high speed.

The fabric weight of the thermally adhesive laminated nonwoven fabric of the invention is preferably from 10 to 150 g/m², more preferably from 12 to 100 g/m² in view of a desired strength and air permeability. When the fabric weight is in the above range, a sufficient strength as well as a good feeling and air permeability is obtained.

The maximum open pore size of the thermally adhesive laminated nonwoven fabric of the present invention is preferably 50 μm or less, more preferably from 1 to 40 μm, still more preferably from 3 to 30 μm. Because gaps among yarns are appropriate when the maximum open pore size is in the above range, the nonwoven fabric shows an excellent filtering function and an excellent barrier function.

The air permeability of the thermally adhesive laminated nonwoven fabric of the invention is preferably from 1 to 100 cm³/cm²·sec, more preferably from 5 to 90 cm³/cm²·sec. When the air permeability is in the above range, the nonwoven fabric shows good air permeability and an excellent barrier function. As a result, powder leakage does not occur.

The burst strength of the thermally adhesive laminated nonwoven fabric of the invention is preferably 100 kPa or more, more preferably from 120 to 1,000 kPa. When a bag that is prepared by heat sealing or the like procedure from the thermally adhesive laminated nonwoven fabric has a burst strength in the above range, the bag in which contents are packed is never torn even if dropping the bag or putting a heavy load such as a person thereon.

EFFECT OF THE INVENTION

The thermally adhesive laminated nonwoven fabric of the present invention is excellent in a burst strength, a filtering function, a barrier function and one side heat-sealing properties, and it is possible in a bag making step to increase the working speed of a heat-sealing, bag making machine and operate the machine stably over a long period of time.

BEST MODE FOR CARRYING OUT THE INVENTION

The present invention is explained below by making reference to examples. However, the present invention is in now way restricted to the examples and the like.

In addition, the measurement methods and evaluation methods are as described below.

(1) Fabric Weight (g/m²)

The fabric weight is measured in accordance with JIS L 1906.

Three samples each 20 cm long and 20 cm wide are cut out of a nonwoven fabric with both ends each 10 cm wide excluded. The mass of each sample is determined, and the average mass of the samples is obtained. The fabric weight is obtained by converting the average mass to a mass per unit area.

(2) Yarn Diameter (μm)

Ten samples each 1×1 cm² are cut out of each of the sections each 20 cm wide of a nonwoven fabric with both ends each 10 cm wide excluded. The yarn diameter of each sample is measured at 30 points with a microscope (VH-8000, manufactured by Keyence Corporation). The average value is calculated (in one decimal place), and represented as the yarn diameter.

(3) Melting Point (° C.)

About 8 mg of a yarn sample is weighed out, and placed in a sample pan. The sample is conditioned with a sample sealer. Using DSC210 manufactured by SII NanoTechnology Inc., the temperature at which the sample shows a maximum melting endothermic peak is measured under the conditions: measurement atmosphere of nitrogen gas (50 ml/min), heating rate of 10° C./min and a measurement temperature range of 25 to 300° C. The peak temperature is defined as the melting point.

When the melting endothermic peak is not definite, the sample pan is heat treated at 120° C. for 24 hours before conducting the measurement, and the melting endothermic peak is measured.

(4) Air Permeability (cm³/cm²·sec)

The air permeability is measured in accordance with JIS L 1906 (Frajour type method).

Five samples are collected from a nonwoven fabric in the width direction with the both ends each 10 cm wide of the nonwoven fabric excluded. The air permeability of the five samples is measured, and the average of the measured values is calculated (in one decimal place).

(5) Powder Leakage Rate (%)

About 10 g of powder dust (seven types) for JIS Z 8901 test is weighed out, and the mass W1 is accurately determined. On the other hand, a sample, 25×25 cm², is cut out of a fabric, attached to a vibrating machine, and vibrated for 10 minutes. The mass W2 of powder dust having passed through the sample is determined, and the powder leakage rate is obtained from the formula:

powder leakage rate=($W2/W1$)×100

(6) Burst Strength (kPa)

The burst strength is measured in accordance with JIS L 1906 (Mullen type method).

Five samples, each about 15×15 cm², are taken from a nonwoven fabric with both ends each 10 cm wide excluded. The burst strength of each sample is measured with a Mullen type burst strength tester. The average (in one decimal place) of the measured values is defined as the burst strength.

(7) Maximum Pore Size (μm)

Measurements are made in accordance with JIS K 3832 (bubble point method).

A circular sample 40 mm in diameter is used, and the maximum pore size is determined by the following procedure:

(i) the sample is soaked in a liquid, and all of the fine pores of the sample are filled with the liquid by a capillary tube action;

(ii) an air pressure is gradually applied from the lower side of the sample, and air bubbles come out when the air pressure overcomes the liquid surface tension within the capillary tubes; and (iii) when air bubbles come out, an air bubble at first comes out of the largest fine pore, and the maximum pore size is calculated by determining the air pressure.

(8) Efficiency (%) of Collecting Particles in Air

Air containing dust having particle size mentioned below is allowed to flow through a sample 10 cm in diameter at a flow rate of 23.6 liter/min, and the efficiency of collecting particles is measured. The particles contained in the air flow have the following particle size ranges: less than 0.3 μm; 0.3 to less than 0.5 μm; 0.5 to less than 1.0 μm; and 1.0 to less than 2.0 μm.

(9) Layer-to-Layer Peel Tenacity (N/25 mm Width)

The layer-to-layer peel tenacity is measured in accordance with JIS L 1089 (peel strength). A sample 25 mm wide and 150 mm long is cut out of a nonwoven fabric. The non-heat-sealing layer of the sample is peeled off the heat-sealing layer from one side in the longitudinal direction (50 mm long), and the tenacity is determined.

The sample is attached to a constant-length tensile tester with a chuck-to-chuck distance of 50 mm, and the strength at peeling is measured when the sample is stretched at a speed of 10 cm/min. Measurements are made at 5 sites in the longitudinal direction, and the average is defined as the layer-to-layer tenacity.

When no peeling takes place between the two layers, the sample is evaluated as "no layer-to-layer peel."

(10) Heat-Sealing Tenacity (N/25 mm Width)

Two heat-sealing layers are used as mutual sealing faces, and heat sealed at given temperatures. A sample 25 mm wide and 20 mm long is then cut out. The heat-sealed portion of the sample is attached to a constant-length tensile tester so that the portion is peeled off in the upper and the lower direction at an angle of 180 degrees. The heat sealed portion is then peeled off with a chuck-to-chuck distance of 100 mm at a tensile speed of 10 cm/min. The strength during peeling is measured at 5 sites in the longitudinal direction, and the average of the maximum strength is obtained and defined as a heat-sealing tenacity.

(11) Hot Tack Tenacity (N/25 mm Width)

A sample 25 mm wide and 400 mm long is cut out of a nonwoven fabric. Using a hot tack tester (Theller Model HT, manufactured by H. W. Theller Inc.), the sample is heat sealed (a seal area of the die of 0.25 cm$^2$, a sealing pressure of 5,000 kPa, sealing time observed of 500 msec). The instantaneous peel tenacity at 200 cm/min is measured.

(12) Solution Viscosity ($\eta_{sp}/c$)

A sample in an amount of 0.025 g is dissolved in 25 ml of o-chlorophenol (OCP). Although the dissolution is conducted at 90° C., the temperature is raised to 120° C. when the dissolution is incomplete.

Using a viscosity tube, measurements are made at 35° C., and the solution viscosity is calculated from the following formula. The measurements are made three times, and the measured values are arithmetically averaged. The average is rounded to two decimals.

$$\eta_{sp}/c=[(t-t_0)/t_0]/c$$

wherein $t_0$ is a falling time of the solvent, t is a falling time of the solution, and c is an amount (g) of the solute per 1,000 ml.

(13) Grade of Fluffing of a Nonwoven Fabric (Fluffing Resistance) (Class)

Measurements are made in accordance with JIS L 0849 (Test Methods for Color Fastness to Rubbing)

A sample 25 mm wide and 300 mm long is cut out of a nonwoven fabric. Using a JSPS (Japan Society for the Promotion of Science) type rubbing tester for color fastness, a friction probe with a load of 500 g was reciprocated 100 times on the sample, and the state of fluffing is judged by the following criteria.

First class: the yarn is cleaved to such a degree that the sample is damaged;

Second class: the yarn is cleaved to such a large extent that the sample becomes thin;

Third class: distinct pills begin to form or a plurality of small pills are observed;

Fourth class: fluffing of yarn is observed a little, but it is not conspicuous; and Fifth class: no fluffing of yarn is observed.

(14) Evaluation of the Adhesion of a Resin to a Hot Plate Heater

Using a hot plate heater 100 mm wide and 7 mm long, two heat-sealing layers are used as sealing faces, and heat sealed at 130° C. at a sealing pressure of 5,000 kPa for 1 sec. The state of adhesion of the resin to the hot plate heater is evaluated.

Example 1

Using a two-component spinneret for spun bonding, a sheath-core composite yarn nonwoven fabric formed from a high density polyethylene (HDPE, having a melting point of 130° C.) as a sheath component and a poly(ethylene terephthalate) (PET, having a melting point of 263° C.) as a core component and having an average yarn diameter of 16 μm was prepared as a (c) layer of a laminated nonwoven fabric.

A poly(ethylene terephthalate) (PET, having a melting point of 260° C.) was injected through an injection spinneret for melt blowing at a spinning temperature of 300° C., at a hot air temperature of 320° C. with an air blowing rate of 1,000 Nm$^3$/hr to give as a (b) layer an extremely fine yarn nonwoven fabric having an average yarn diameter of 2 μm. The extremely fine yarn nonwoven fabric thus obtained was laminated to the (c) layer.

A poly(ethylene terephthalate) (PET, having a melting point of 263° C.) was injected through a spinneret for spun bonding at a spinning temperature of 300° C. to give as an (a) layer a PET nonwoven fabric having an average yarn diameter of 14 μm. The PET nonwoven fabric was laminated to the (b) layer to give a nonwoven fabric composed of three layers as a whole and having a fabric weight of 50 g/m$^2$.

The nonwoven fabric thus obtained and composed of three layers was heat contact bonded with an emboss roll having a contact bonding area ratio of 15%, at a line pressure of 350 N/cm, and at an upper temperature of 230° C. and a lower temperature of 110° C. to be integrated and give a laminated nonwoven fabric.

Example 2

A nonwoven fabric having a fabric weight of 50 g/m$^2$ and composed of three layers was prepared in the same manner as in Example 1 except that the sheath component of the sheath-core composite yarn of the (c) layer was changed to a copolymerized polyester (melting point of 160° C.). The thus obtained nonwoven fabric composed of three layers was partially heat contact bonded with an emboss roll having a contact bonding area ratio of 15%, at a line pressure of 350 N/cm, and at an upper temperature of 230° C. and a lower temperature of 130° C. to give a laminated nonwoven fabric.

Example 3

A nonwoven fabric having a fabric weight of 50 g/m$^2$ and composed of three layers was prepared in the same manner as in Example 1 except that the sheath component of the sheath-core composite yarn of the (c) layer was changed to a copolymerized polyester (melting point of 208° C.). The thus obtained nonwoven fabric composed of three layers was partially heat contact bonded with an emboss roll having a contact bonding area ratio of 15%, at a line pressure of 350 N/cm, and at an upper temperature of 230° C. and a lower temperature of 130° C. to give a laminated nonwoven fabric.

Example 4

A nonwoven fabric having a fabric weight of 50 g/m$^2$ and composed of three layers was prepared in the same manner as in Example 1 except that the (a) layer was changed to a copolymerized polyester (melting point of 230° C.). The thus obtained nonwoven fabric composed of three layers was partially heat contact bonded with an emboss roll having a contact bonding area ratio of 15%, at a line pressure of 350 N/cm, and at an upper temperature of 200° C. and a lower temperature of 110° C. to give a laminated nonwoven fabric.

Examples 5 and 6

A laminated nonwoven fabric having a fabric weight of 50 g/m² and composed of three layers was obtained in the same manner as in Example 1 except that the ratio of an amount of the extremely fine yarn to a total yarn amount of the laminated nonwoven fabric was changed to 10 wt. % (Example 5) or 30 wt. % (Example 6).

Example 7

A laminated nonwoven fabric having a fabric weight of 50 g/m² and composed of three layers was obtained in the same manner as in Example 1 except that the PET of the (b) layer was injected through an injection spinneret for melt blowing at a spinning temperature of 300° C. and in an heated air amount of 1,000 Nm³/hr to give an extremely fine yarn nonwoven fabric having an average yarn diameter of 5 μm.

Comparative Example 1

Comparative Example 1 is an instance of a single layer nonwoven fabric.

A sheath-core composite yarn nonwoven fabric wherein the core component was composed of a poly(ethylene terephthalate), the sheath component was composed of a high density polyethylene, and the average yarn diameter was 16 μm was prepared in the same manner as in the production method of the sheath-core composite yarn nonwoven fabric in Example 1.

Comparative Example 2

A nonwoven fabric having a fabric weight of 25 g/m² was prepared as a (c) layer in the same manner as in the production method of the nonwoven fabric of the (c) layer in Example 1. A nonwoven fabric having a fabric weight of 25 g/m² was prepared as an (a) layer in the same manner as in the production method of the nonwoven fabric of the (a) layer in Example 1. The (a) layer was laminated to the (c) layer to give nonwoven fabric composed of two layers.

Tables 1 to 5 show the properties and evaluation results of the laminated nonwoven fabrics obtained in the examples and comparative examples explained above.

It is evident from Tables 1 to 4 that a laminated nonwoven fabric obtained by inserting a polyester extremely fine yarn layer of the (b) layer between a polyester filament yarn nonwoven fabric layer of the (a) layer and a thermoplastic composite filament yarn nonwoven fabric layer of the (c) layer and heat bonding is excellent in one side thermal adhesivity, has excellent properties such as a burst strength of 40 to 530 kPa and a heat-sealing tenacity of 22 N/25 mm width or more, and shows an excellent filtering function and no powder leakage for fine or friable particles.

In contrast to the above results, it is understood that a nonwoven fabric in Comparative Example 1 or 2 having no polyester extremely fine yarn layer ((b)) layer) has poor properties compared with those of the laminated nonwoven fabrics of the invention (Examples 1 to 7).

Moreover, the following is evident from Table 4 and FIG. 1. It is understood that the laminated nonwoven fabric of the invention can heat seal in a wide temperature range from low to high temperature, and that it shows a stabilized high heat-sealing tenacity because the variation of the heat-sealing tenacity (R/x) is 53% or less.

Figure 2:
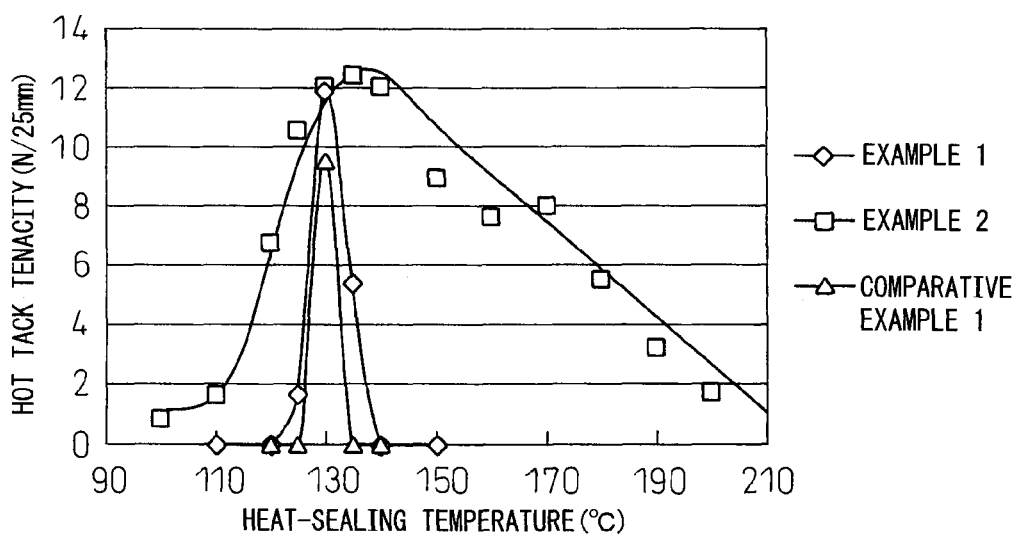
FIG. 2 is a graph showing one example of the relationship between a heat-sealing temperature and a hot tack tenacity.

Furthermore, it is evident from Table 5 and FIG. 2 that the laminated nonwoven fabric of the invention compared with the nonwoven fabrics of comparative examples is excellent in a hot tack tenacity showing a heat-sealing function as instantaneous as 0.5 sec. The laminated nonwoven fabric of the invention is therefore suited to high speed heat sealing.

INDUSTRIAL APPLICABILITY

The thermally adhesive laminated nonwoven fabric of the present invention is excellent in a burst strength and a heat-sealing tenacity as well as a filtering function (as a shielding function) and a barrier function, and shows stabilized excellent heat-sealing properties and instantaneous heat-sealing properties.

Accordingly, by utilizing these properties, the thermally adhesive laminated nonwoven fabric of the invention can be appropriately used in many fields, for example, a field of packaging material (such as a packaging material for drying agents) required to have both the shielding properties and the heat-sealing properties), a field of filtering (such as a coffee filter, a tea filter and bags for seasoning material), a medical field, life articles (such as charcoal bags and a packaging material for a dehumidifying agent), and the like.

TABLE 1

|  |  |  | Ex. 1 | Ex. 2 | Ex. 3 | Ex. 4 | Ex. 5 | Ex. 6 | Ex. 7 | C. E. 1 | C. E. 2 |
| --- | --- | --- | --- | --- | --- | --- | --- | --- | --- | --- | --- |
| (a) layer | TP fil. yarn* | Material | PET | PET | PET | Copoly. polyester* | PET | PET | PET | — | PET |
|  |  | Melting point (° C.) | 263 | 263 | 263 | 230 | 263 | 263 | 263 | — | 263 |
|  |  | Yarn dia. (μm) | 14 | 14 | 14 | 14 | 14 | 14 | 14 | — | 14 |
|  |  | Fabric wt. (g/m²) | 21 | 21 | 21 | 21 | 22.5 | 17.5 | 21 | — | 25 |
| (b) layer | TP EF yarn* | Material | PET | PET | PET | PET | PET | PET | PET | — | — |
|  |  | Melting point (° C.) | 260 | 260 | 260 | 260 | 260 | 260 | 260 | — | — |
|  |  | Yarn dia. (μm) | 2 | 2 | 2 | 2 | 2 | 2 | 5 | — | — |
|  |  | Fabric wt. (g/m²) | 8 | 8 | 8 | 8 | 5 | 15 | 8 | — | — |

TABLE 1-continued

|  |  |  | Ex. 1 | Ex. 2 | Ex. 3 | Ex. 4 | Ex. 5 | Ex. 6 | Ex. 7 | C. E. 1 | C. E. 2 |
|---|---|---|---|---|---|---|---|---|---|---|---|
| (c) layer | TP CF yarn* | Material | PE/PET | Copoly. polyester*/ PET | Copoly. polyester*/ PET | PE/PET | PE/PET | PE/PET | PE/PET | PE/PET | PE/PET |
|  |  | Melting point (° C.) | 130/263 | 160/263 | 208/263 | 130/263 | 130/263 | 130/263 | 130/263 | 130/263 | 130/263 |
|  |  | Yarn dia. (μm) | 16 | 14 | 14 | 16 | 16 | 16 | 16 | 16 | 16 |
|  |  | Fabric wt. (g/m$^2$) | 21 | 21 | 21 | 21 | 22.5 | 17.5 | 21 | 50 | 25 |

Note:
TP fil. yarn = Thermoplastic filament yarn
TP EF yarn = Thermoplastic extremely fine yarn
TP CF yarn = Thermoplastic composite filament yarn
Copoly. polyester = Copolymerized polyester

TABLE 2

|  | Ex. 1 | Ex. 2 | Ex. 3 | Ex. 4 | Ex. 5 | Ex. 6 | Ex. 7 | C. E. 1 | C. E. 2 |
|---|---|---|---|---|---|---|---|---|---|
| Fabric wt. of laminated nonwoven fabric (g/m$^2$) | 50 | 50 | 50 | 50 | 50 | 50 | 50 | 50 | 50 |
| Extremely fine yarn/whole yarn amt. (wt. %) | 17 | 17 | 17 | 17 | 10 | 30 | 17 | 0 | 0 |
| Partial heat contact bonding ratio (%) | 15 | 15 | 15 | 15 | 15 | 15 | 15 | 15 | 15 |
| Air permeability (cm$^3$/cm$^2$·sec) | 20 | 18 | 18 | 33 | 33 | 8 | 45 | 95 | 130 |
| Powder leakage rate (%) | 0.5 | 0.1 | 0.1 | 0.4 | 1.1 | 0.1 | 8 | 21 | 27 |
| Maximum pore size (mm) | 30 | 25 | 25 | 28 | 33 | 16 | 50 | 70 | 85 |
| Burst strength (kPa) | 450 | 530 | 530 | 490 | 440 | 420 | 400 | 390 | 320 |
| Layer-to-layer peel tenacity (N/25 mm) | 2.5 | No peeling | No peeling | 3.0 | 2.5 | 2.3 | 1.8 | No peeling | 1.3 |
| Surface wear strength (class)* longitudinal | 3-4 | 4-5 | 4-5 | 4 | 3-4 | 3-4 | 2-3 | 5 | 2 |
| Surface wear strength (class)* transverse | 3-4 | 4-5 | 4-5 | 4 | 3-4 | 3-4 | 2-3 | 5 | 2 |
| Resin sticking to hot plate heater (Striking through of resin) | No | No | No | No | No | No | No | Yes | Yes |

Note:
Third or upper class is accepted.

TABLE 3

| Efficiency of Collecting Particles in Air (%) | | | | |
|---|---|---|---|---|
| | Particle size of dust (μm) | | | |
| | 0.3 | 0.5 | 1.0 | 2.0 |
| Ex. 1 | 32% | 39% | 55% | 75% |
| Ex. 2 | 37% | 46% | 67% | 88% |
| Ex. 3 | 38% | 47% | 69% | 90% |
| Comp. Ex. 1 | 17% | 17% | 21% | 34% |

TABLE 4

| Heat-Sealing Tenacity (N/25 mm width) | | | | | | | | | | | | | |
|---|---|---|---|---|---|---|---|---|---|---|---|---|---|
| | Heat-sealing temperature (° C.) | | | | | | | | | | | | R/x |
| | 125 | 130 | 140 | 150 | 160 | 170 | 180 | 190 | 200 | 210 | 220 | 230 | (%) |
| Ex. 1 | 37 | 25 | 26 | 32 | 24 | 22 | 35 | 25 | 31 | 25 | 28 | 28 | 53 |
| Ex. 2 | 30 | 31 | 26 | 31 | 32 | 35 | 38 | 31 | 37 | 38 | 38 | 37 | 36 |
| Ex. 3 | 31 | 31 | 32 | 30 | 30 | 35 | 36 | 32 | 33 | 37 | 38 | 37 | 101 |
| Comp. Ex. 1 | 10 | 17 | 31 | 40 | 45 | 50 | 46 | 44 | 48 | 50 | 48 | 44 | 24 |

TABLE 5

| | Hot Tack Tenacity (N/25 mm width) | | | | | | | | | | | | |
|---|---|---|---|---|---|---|---|---|---|---|---|---|---|
| | Heat-sealing temperature (° C.) | | | | | | | | | | | | |
| | 100 | 110 | 120 | 125 | 130 | 135 | 140 | 150 | 160 | 170 | 180 | 190 | 200 |
| Ex. 1 | 0.0 | 0.0 | 0.0 | 1.7 | 11.9 | 5.4 | 0.0 | 0.0 | 0.0 | 0.0 | 0.0 | 0.0 | 0.0 |
| Ex. 2 | 0.9 | 1.7 | 6.8 | 10.6 | 12.1 | 12.5 | 12.1 | 9.0 | 7.7 | 8.1 | 5.6 | 3.3 | 1.8 |
| Ex. 3 | 2.1 | 4.2 | 6.5 | 8.1 | 10.1 | 10.2 | 10.0 | 9.3 | 7.5 | 5.2 | 3.5 | 1.8 | 1.0 |
| Comp. Ex. 1 | 0.0 | 0.0 | 0.0 | 0.0 | 9.6 | 0.0 | 0.0 | 0.0 | 0.0 | 0.0 | 0.0 | 0.0 | 0.0 |

The invention claimed is:

1. A thermally adhesive laminated nonwoven fabric comprising a laminated nonwoven fabric in which nonwoven fabrics of the following (a) layer, (b) layer and (c) layer are integrated by heat contact bonding;
   (a) a nonwoven fabric layer consisting of one filament yarn consisting of a thermoplastic resin;
   (b) an intermediate nonwoven fabric layer having at least one extremely fine yarn having an average yarn diameter of from 1 to 3 μm consisting of the same type of thermoplastic resin as that of the (a) layer; and
   (c) a nonwoven fabric layer consisting of one composite filament yarn of thermoplastic resins,
   the fabric satisfying the following (1) and (2):
   (1) a difference between a melting point of the yarn forming the nonwoven fabric of the (a) layer and that of the yarn forming the nonwoven fabric of the (b) layer is 30° C. or less; and
   (2) the filament yarn consisting of a thermoplastic resin and forming the nonwoven fabric of the (a) layer is different from the composite filament yarn of thermoplastic resins and forming the nonwoven fabric of the (c) layer, the composite filament yarn composed of thermoplastic resins and forming the nonwoven fabric of the (c) layer contains a low melting point component, and a melting point of the low melting point component is lower than the melting point of the yarn forming the nonwoven fabric of the (a) layer by 40 to 150° C.

2. The thermally adhesive laminated nonwoven fabric according to claim 1, wherein an amount (wt. %) of the extremely fine yarn forming the nonwoven fabric of the (b) layer is from 5 to 50 wt.% based on the yarn amount of the whole laminated nonwoven fabric.

3. The thermally adhesive laminated nonwoven fabric according to claim 1, wherein the filament yarn consisting of a thermoplastic resin and forming the nonwoven fabric of the (a) layer is a polyester filament yarn.

4. The thermally adhesive laminated nonwoven fabric according to claim 1, wherein the composite filament yarn of thermoplastic resins and forming the nonwoven fabric of the (c) layer is a sheath-core composite yarn in which the low melting point component is used as the sheath component.

5. The thermally adhesive laminated nonwoven fabric according to claim 3, wherein the polyester filament yarn forming the nonwoven fabric of the (a) layer is a poly(ethylene terephthalate) yarn.

6. The thermally adhesive laminated nonwoven fabric according to claim 4, wherein the sheath component of the sheath-core composite yarn is a polyethylene, and the core component is a poly(ethylene terephthalate).

7. The thermally adhesive laminated nonwoven fabric according to claim 4, wherein the sheath component of the sheath-core composite yarn is a copolymerized polyester, and the core component is a poly(ethylene terephthalate).

8. The thermally adhesive laminated nonwoven fabric according to claim 1, wherein when an external surface of the (c) layer of the thermally adhesive laminated nonwoven fabric is mutually superimposed and heat sealed, a heat-sealing tenacity is 0.2 (N/25 mm width·[m$^2$]) or more at a heat-sealing temperature range of from 125 to 230° C., and a variation rate of the heat-sealing tenacity R/x (wherein R represents a variation, and x represents the average value) is 80% or less.

* * * * *